(12) United States Patent
Merlo et al.

(10) Patent No.: US 9,539,568 B2
(45) Date of Patent: Jan. 10, 2017

(54) PROCESS FOR THE PREPARATION OF CROSS-LINKED FLUORINATED POLYMERS

(75) Inventors: Luca Merlo, Montorfano (IT); Claudio Oldani, Nerviano (IT)

(73) Assignee: SOLVAY SPECIALTY POLYMERS ITALY S.P.A., Bollate (Milan) (IT)

(*) Notice: Subject to any disclaimer, the term of this patent is extended or adjusted under 35 U.S.C. 154(b) by 179 days.

(21) Appl. No.: 14/007,117

(22) PCT Filed: Apr. 4, 2012

(86) PCT No.: PCT/EP2012/056127
§ 371 (c)(1),
(2), (4) Date: Sep. 24, 2013

(87) PCT Pub. No.: WO2012/136688
PCT Pub. Date: Oct. 11, 2012

(65) Prior Publication Data
US 2014/0017599 A1    Jan. 16, 2014

(30) Foreign Application Priority Data
Apr. 7, 2011 (EP) .................................. 11161554

(51) Int. Cl.
| | |
|---|---|
| B01J 39/20 | (2006.01) |
| B01D 67/00 | (2006.01) |
| B01D 71/32 | (2006.01) |
| B01D 71/82 | (2006.01) |
| C08J 5/22 | (2006.01) |
| H01M 8/10 | (2016.01) |

(52) U.S. Cl.
CPC ............ *B01J 39/20* (2013.01); *B01D 67/0006* (2013.01); *B01D 71/32* (2013.01); *B01D 71/82* (2013.01); *C08J 5/225* (2013.01); *H01M 8/1023* (2013.01); *H01M 8/1039* (2013.01); *H01M 8/1072* (2013.01); *B01D 2323/30* (2013.01); *C08J 2327/12* (2013.01); *H01M 2300/0082* (2013.01); *Y02E 60/521* (2013.01); *Y02P 70/56* (2015.11); *Y10T 428/249921* (2015.04); *Y10T 428/249991* (2015.04)

(58) Field of Classification Search
None
See application file for complete search history.

(56) References Cited

U.S. PATENT DOCUMENTS

| | | |
|---|---|---|
| 3,071,565 A | 1/1963 | Davis, Jr. et al. |
| 3,884,885 A | 5/1975 | Grot |
| 3,988,502 A | 10/1976 | Patel et al. |
| 4,433,082 A | 2/1984 | Grot |
| 4,940,525 A | 7/1990 | Ezzell et al. |
| 6,733,914 B1 | 5/2004 | Grot et al. |
| 2002/0007083 A1 | 1/2002 | DesMarteau et al. |
| 2003/0148161 A1 | 8/2003 | Nuber et al. |
| 2004/0122256 A1 | 6/2004 | Ikeda et al. |
| 2005/0019638 A1* | 1/2005 | Ravikiran .............. C08G 61/06 526/308 |

FOREIGN PATENT DOCUMENTS

| | | |
|---|---|---|
| EP | 1 172 382 A2 | 1/2002 |
| EP | 1 238 999 A1 | 9/2002 |
| EP | 1 239 000 A1 | 9/2002 |
| EP | 1 323 751 A2 | 7/2003 |
| WO | 2007/142885 A1 | 12/2007 |
| WO | 2007/142886 A2 | 12/2007 |
| WO | WO 2007/142885 | * 12/2007 |

OTHER PUBLICATIONS

Arnett, Journal of Power Sources, 172 (2007) p. 20-29.*
Kerres, Journal of Polymer Science: Part A: Polymer Chemsitry, vol. 36, p. 1441-1448 (1998).*
Kariduraganavar M.Y. et al., "Ion-exchange membranes: preparative methods for electrodialysis and fuel cell applications", Desalination, Oct. 2006, vol. 197, issues 1-3, p. 225-246—Elsevier B.V.
Ukihashi H. et al., "Polymeric fluorocarbon acids and their applications", Progress in Polymer Science, 1986, vol. 12, n. 4, p. 229-270.

* cited by examiner

*Primary Examiner* — Robert C Boyle

(57) ABSTRACT

A process for the preparation of cross-linked fluorinated polymers comprising sulfonic acid functional groups comprising the steps of: a) providing at least one fluorinated polymer (P) comprising at least one —$SO_3M$ functional group and less than 2% of —$SO_2F$ functional groups with respect to the total amount of —SO3M and —$SO_2F$ functional groups, wherein each M is selected from H and alkaline metals; and b) reacting said fluorinated polymer with at least one cross-linking agent of formula R(X)n under conditions that promote the formation of covalent bonds between the at least one functional group —$SO_3M$ of fluorinated polymer (P) and at least one functional group X of the cross-linking agent.

10 Claims, No Drawings

PROCESS FOR THE PREPARATION OF CROSS-LINKED FLUORINATED POLYMERS

RELATED APPLICATIONS

This application is a U.S. national stage entry under 35 U.S.C. §371 of International Application No. PCT/EP2012/056127 filed Apr. 4, 2012, which claims priority to European Application No. EP 11161554.8 filed on Apr. 7, 2011. The entire contents of these applications are explicitly incorporated herein by this reference.

This application claims priority to European application No. 11161554.8 filed on 7 Apr. 2011, the whole content of this application being incorporated herein by reference for all purposes.

TECHNICAL FIELD

The present invention relates to a process for the preparation of cross-linked polymers comprising sulfonic acid functional groups, to the articles comprising the cross-linked polymers obtained therefrom and to liquid compositions suitable for carrying out the process.

BACKGROUND ART

Fluorinated polymers containing sulfonic acid functional groups, due to their ion conducting properties, have found widespread use in the manufacture of electrolyte membranes for electrochemical devices such as electrolysis cells and fuel cells. Notable examples are for instance proton exchange membrane (PEM) fuel cells which employ hydrogen as the fuel and oxygen or air as the oxidant.

Fluorinated polymers containing sulfonic acid functional groups have also been known to provide hydrophilic fluorinated surfaces due to the presence of the sulfonic acid groups.

To provide a high proton transport capability to an electrolyte membrane or to efficiently interact with water in a hydrophilic fluorinated surface polymers having a high number of sulfonic acid groups are required, which however are generally provided with reduced mechanical and physical resistance with consequent negative effects on the duration of the articles obtained therefrom.

The use of cross-linking to improve the physical resistance of membranes made from fluorinated polymers containing sulfonic acid functional groups has been previously disclosed. For instance, EP 1238999 A (SOLVAY SOLEXIS SPA) 11 Sep. 2002 and EP 1239000 A (SOLVAY SOLEXIS SPA) 11 Sep. 2002 disclose hydrophilic membranes comprising cross-linkable sulfonic fluorinated polymers comprising: monomeric units deriving from tetrafluoroethylene, fluorinated monomeric units containing sulfonyl groups —SO$_2$F, and from 0.01% to 5% by moles of monomeric units deriving from a bis-olefin of formula (I): R$_1$R$_2$C=CH—(CF$_2$)$_m$—CH=CR$_5$R$_6$ (wherein m=2-10, R$_1$, R$_2$, R$_5$, R$_6$, equal to or different from each other, are H or C$_1$-C$_5$ alkyl groups). The membranes are obtained by cross-linking of the sulfonic fluorinated polymer, the cross-linking involving the backbone of the polymer. The membranes are suitable both for use as ion conducting membranes in electrochemical cells as well as filtration membranes.

Cross-linking of fluorinated polymers involving the sulfonyl fluoride functional group precursor to the sulfonic acid functional group has also been previously described. U.S. Pat. No. 6,733,914 (ION POWER, INC.) 11 May 2004 discloses ion exchange membranes comprising cross-linked polymers having the following structure:

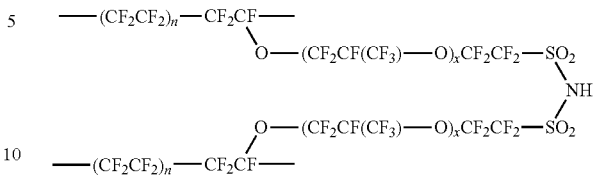

obtained by treatment of the fluorinated polymer comprising —SO$_2$F functional groups with ammonia, followed by hydrolysis of the residual —SO$_2$F functional groups with a strong base and then by heat treatment. The resulting bridging group has however a limiting effect on the water absorption ability of the membrane.

WO 2007/142885 A (E.I. DU PONT DE NEMOURS) 13 Dec. 2007 and WO 2007/142886 A (E.I. DU PONT DE NEMOURS) 13 Dec. 2007 similarly disclose the cross-linking of fluorinated polymers involving the reaction of —SO$_2$F functional groups. In particular these documents disclose the cross-linking of polymers comprising 95% to 5% of —SO$_2$X functional groups (X=halogen) and 5% to 95% of —SO$_2$X functional groups that have reacted with a nucleophilic compound Y with a cross-linkable compound having the potential to form cross-links with the —SO$_2$X functional groups. The cross-linkable compound thus reacts with the residual —SO$_2$X functional groups in the fluorinated polymer. It has to be noted that the cross-linking reaction between the —SO$_2$F (or —SO$_2$X) functional groups and the cross-linking compound may lead to the formation of hydrogen fluoride (or HX) which has to be properly removed from the resulting cross-linked polymer.

Additionally, the resulting membranes comprising the cross-linked fluorinated polymer have to be submitted to hydrolysis and acidification treatment to transform the —SO$_2$X functional groups that have not reacted with the cross-linking compound and the —SO$_2$X functional groups reacted with the nucleophilic compound Y in the ion conducting acid —SO$_3$H form.

From the foregoing it becomes apparent that the need still exist for providing articles, in particular membranes, with improved physical and mechanical resistance by the cross-linking of fluorinated polymers comprising sulfonic acid functional groups without affecting the ion conducting capability and hydrophilicity of the polymer and with a process involving a reduced amount of steps.

DESCRIPTION OF INVENTION

A first object of the present invention is a process for the preparation of a cross-linked fluorinated polymer (XLP) comprising sulfonic acid functional groups comprising the steps of:
a) providing a fluorinated polymer (P) comprising at least one —SO$_3$M functional group, wherein each M is selected from the group consisting of H and alkaline metals, said fluorinated polymer (P) containing less than 2% of —SO$_2$F functional groups with respect to the total number of —SO$_3$M and —SO$_2$F functional groups in the polymer; and
b) reacting said fluorinated polymer (P) with at least one cross-linking agent (XL) of formula R(X)$_n$ wherein R is selected from a bond, O, S, N or R is an aromatic or aliphatic group, linear, cyclic, branched, optionally substituted and/or fluorinated, optionally comprising heteroatoms (O, S, N); n is an integer ≥2; and wherein X is a functional group selected from the group consisting of —$NH_2$, —$NHR_a$ ($R_a$=$C_1$-$C_{20}$ alkyl, —Si($R_b$)$_3$, $R_b$=$C_1$-$C_5$ alkyl), —OH, —$SO_2W$ (W=OH, F, Cl, Br, I), said reaction being carried out under conditions that promote the formation of covalent bonds between the at least one functional group —$SO_3M$ of fluorinated polymer (P) and at least one functional group X in cross-linking agent (XL).

The term "cross-link" is used herein to refer to a covalent chemical bond bridging one polymer chain to another and the term "cross-linking" is used herein to refer to a process of chemically joining two or more polymer molecules by cross-links.

A "cross-linking agent" is defined herein as a substance that, added to a polymer and/or polymer composition promotes cross-linking.

The expression "fluorinated" is used herein to refer to compounds (e.g. polymers, monomers etc.) that are either totally or partially fluorinated, i.e. wherein all or only a part of the hydrogen atoms have been replaced by fluorine atoms. Preferably, the term "fluorinated" refers to compounds that contain a higher proportion of fluorine atoms than hydrogen atoms, more preferably to compounds that are totally free of hydrogen atoms, i.e. wherein all the hydrogen atoms have been replaced by fluorine atoms.

Step a) of the process comprises providing a fluorinated polymer (P) comprising at least one —$SO_3M$ functional group, wherein each M is selected from the group consisting of H and alkaline metals. For the avoidance of doubt, the term "alkaline metal" is hereby intended to denote the following metals: Li, Na, K, Rb, Cs; Li, Na, K being the preferred alkaline metals. Preferably M is H.

The amount of —$SO_3M$ functional groups in fluorinated polymer (P), measured in terms of acid groups —$SO_3H$, is correlated with the so-called "equivalent weight" (EW) of the polymer, that is the grams of fluorinated polymer per mole of acid functional groups.

Fluorinated polymer (P) typically has an equivalent weight of at least 380 g/eq, preferably of at least 450 g/eq, more preferably of at least 500 g/eq. The equivalent weight typically does not exceed 1600 g/eq, preferably it does not exceed 1200 g/eq, more preferably it does not exceed 900 g/eq.

Fluorinated polymers comprising at least one —$SO_3M$ functional group are typically prepared from fluorinated polymers comprising at least one —$SO_2F$ functional group by methods known in the art.

The number of residual —$SO_2F$ functional groups in fluorinated polymer (P) is less than 2% of the total number of —$SO_3M$ and —$SO_2F$ functional groups in fluorinated polymer (P). Typically, the number of —$SO_2F$ functional groups in fluorinated polymer (P) is less than 1%, preferably less than 0.5%, still preferably less than 0.2%, more preferably less than 0.1% and even more preferably less than 0.05% of the total number of —$SO_3M$ and —$SO_2F$ functional groups in fluorinated polymer (P). Fluorinated polymer (P) may advantageously have a number of —$SO_2F$ functional groups of less than 0.01%, even of less than 0.001% of the total number of —$SO_3M$ and —$SO_2F$ functional groups.

A lower residual amount of —$SO_2F$ functional groups generally corresponds to a higher solubility of fluorinated polymer (P) in polar solvents, e.g. water.

Fluorinated polymer (P) can be obtained in its salified form, i.e. wherein M is a cation selected from the alkaline metals, by treatment of the corresponding polymer comprising at least one —$SO_2F$ functional group with a strong base (e.g. NaOH, KOH).

Fluorinated polymer (P) can be obtained in its acid form, i.e. wherein M is H, by treatment of the corresponding salified form of the polymer with a concentrated acid solution. Preferably fluoropolymer (P) is in its acid form.

Suitable fluorinated polymers comprising at least one —$SO_2F$ functional group are those polymers comprising recurring units deriving from at least one ethylenically unsaturated fluorinated monomer containing at least one —$SO_2F$ functional group (monomer (A) as hereinafter defined) and recurring units deriving from at least one ethylenically unsaturated fluorinated monomer (monomer (B) as hereinafter defined).

The phrase "at least one monomer" is used herein with reference to monomers of both type (A) and (B) to indicate that one or more than one monomer of each type can be present in the polymer. Hereinafter the term monomer will be used to refer to both one and more than one monomer of a given type.

Non limiting examples of suitable monomers (A) are:
sulfonyl fluoride fluoroolefins of formula: $CF_2$=$CF(CF_2)_pSO_2F$ wherein p is an integer between 0 and 10, preferably between 1 and 6, more preferably p is equal to 2 or 3;
sulfonyl fluoride fluorovinylethers of formula: $CF_2$=CF—O—$(CF_2)_mSO_2F$ wherein m is an integer between 1 and 10, preferably between 1 and 6, more preferably between 2 and 4, even more preferably m equals 2; sulfonyl fluoride fluoroalkoxyvinylethers of formula:
$CF_2$=CF—(OCF$_2$CF($R_{F1}$))$_w$—O—$CF_2$(CF($R_{F2}$))$_ySO_2F$ wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F;
sulfonyl fluoride aromatic fluoroolefins of formula $CF_2$=CF—Ar—$SO_2F$ wherein Ar is a $C_5$-$C_{15}$ aromatic or heteroaromatic substituent.

Preferably monomer (A) is selected from the group of the sulfonyl fluoride fluorovinylethers of formula $CF_2$=CF—O—$(CF_2)_m$—$SO_2F$, wherein m is an integer between 1 and 6, preferably between 2 and 4.

More preferably monomer (A) is $CF_2$=$CFOCF_2CF_2$—$SO_2F$ (perfluoro-5-sulfonylfluoride-3-oxa-1-pentene).

Non limiting examples of suitable ethylenically unsaturated fluorinated monomers of type (B) are:
$C_2$-$C_8$ fluoroolefins, such as tetrafluoroethylene (TFE), pentafluoropropylene, hexafluoropropylene (HFP), and hexafluoroisobutylene;
vinylidene fluoride (VDF);
$C_2$-$C_8$ chloro- and/or bromo- and/or iodo-fluoroolefins, such as chlorotrifluoroethylene (CTFE) and bromotrifluoroethylene;
fluoroalkylvinylethers of formula $CF_2$=$CFOR_{f1}$, wherein $R_{f1}$ is a $C_1$-$C_6$ fluoroalkyl, e.g. —$CF_3$, —$C_2F_5$, —$C_3F_7$;
fluoro-oxyalkylvinylethers of formula $CF_2$=$CFOR_{O1}$, wherein $R_{O1}$ is a $C_1$-$C_{12}$ fluoro-oxyalkyl having one or more ether groups, for example perfluoro-2-propoxypropyl;
fluoroalkyl-methoxy-vinylethers of formula $CF_2$=$CFOCF_2OR_{f2}$ in which $R_{f2}$ is a $C_1$-$C_6$ fluoroalkyl, e.g. —$CF_3$, —$C_2F_5$, —$C_3F_7$ or a $C_1$-$C_6$ fluorooxyalkyl having one or more ether groups, like —$C_2F_5$—O—$CF_3$;

fluorodioxoles, of formula:

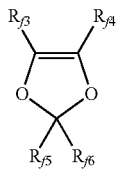

wherein each of $R_{f3}$, $R_{f4}$, $R_{f5}$, $R_{f6}$, equal or different each other, is independently a fluorine atom, a $C_1$-$C_6$ fluoro(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Preferably monomer (B) is selected among:

$C_3$-$C_8$ fluoroolefins, preferably tetrafluoroethylene (TFE) and/or hexafluoropropylene (HFP);

chloro- and/or bromo- and/or iodo-$C_2$-$C_6$ (per)fluoroolefins, like chlorotrifluoroethylene (CTFE) and/or bromotrifluoroethylene;

fluoroalkylvinylethers of formula $CF_2$=$CFOR_{f1}$ in which $R_{f1}$ is a $C_1$-$C_6$ fluoroalkyl, e.g. —$CF_3$, —$C_2F_5$, —$C_3F_7$;

fluoro-oxyalkylvinylethers of formula $CF_2$=$CFOR_{O1}$, in which $R_{O1}$ is a $C_1$-$C_{12}$ fluorooxyalkyl having one or more ether groups, like perfluoro-2-propoxy-propyl.

More preferably monomer (B) is TFE.

Preferably, the fluorinated polymer comprising at least one —$SO_2F$ functional group consists of recurring units deriving from at least one ethylenically unsaturated fluorinated monomer (A) containing at least one sulfonyl fluoride functional group and from at least one ethylenically unsaturated fluorinated monomer (B).

The fluorinated polymer comprising at least one —$SO_2F$ functional group may be prepared by any polymerization process known in the art. Suitable processes for the preparation of such polymers are for instance those described in U.S. Pat. No. 4,940,525 (THE DOW CHEMICAL COMPANY) 10 Jul. 1990, EP 1323751 A (SOLVAY SOLEXIS SPA) 2 Jul. 2003, EP 1172382 A (SOLVAY SOLEXIS SPA) 16 Nov. 2002.

The fluorinated polymer comprising at least one —$SO_2F$ functional group may be optionally treated, e.g. with elemental fluorine, to remove polar chain end-groups to provide a fully fluorinated structure.

In the process of the invention fluorinated polymer (P) may be provided in any physical form.

According to a first embodiment fluorinated polymer (P) may be provided in solid form, for instance in the form of powder, pellets, granules or in the form of a film. The term "film" meaning to indicate a thin flexible transparent sheet.

According to a second embodiment fluorinated polymer (P) may be provided in the form of a liquid composition comprising the fluorinated polymer (P) under dissolved or dispersed form in a suitable solvent. The term "dissolved form" is intended to denote a "true" solution of the fluorinated ion exchange polymer. The wording "dispersed form" is hereby intended to denote a colloidal suspension of the fluorinated polymer, whereby particles of fluorinated polymer of average particle size of generally less than 500 nm are stably suspended with no settlement phenomena when left in unperturbed state.

The liquid composition may advantageously be prepared by a dissolution process wherein fluorinated polymer (P) is contacted with a liquid medium under suitable temperature conditions.

Typically, the liquid composition comprising fluorinated polymer (P) comprises a liquid medium comprising water. Generally, the liquid composition comprises a water or water/alcoholic mixture as liquid medium, optionally comprising additional ingredients and/or additives.

Suitable alcohols which can be used, in particular as water/alcoholic mixture, are notably methanol, ethanol, propyl alcohols (i.e. isopropanol, n-propanol), ethylene glycol, diethylene glycol.

Other liquid media that can be used are polar aprotic organic solvents such as ketones, like acetone, methylethylketone, esters, like methylacetate, dimethylcarbonate, diethylcarbonate, ethylacetate, nitriles, like acetonitrile, sulphoxides, like dimethylsulfoxide, amides, like N,N-dimethylformamide, N,N-dimethylacetamide, pyrrolidones, like N-methylpyrrolidone, N-ethylpyrrolidone.

In general, good results have been obtained with liquid compositions wherein the liquid medium is water or a mixture of water and alcohol, preferably of water and propyl alcohol(s).

The liquid composition may advantageously be prepared by contacting the fluorinated polymer (P) with water or a mixture of water and alcohol, at a temperature of from 40° C. to 300° C. in an autoclave.

In step b) of the process the fluorinated polymer (P) is reacted with at least one cross-linking agent (XL) of formula $R(X)_n$ under conditions that promote the formation of covalent bonds between the at least one functional group —$SO_3M$ of fluorinated polymer (P) and at least one functional group X of cross-linking agent (XL).

In formula $R(X)_n$ R may be a bond bridging two functional groups X or it may be a heteroatom selected from O, S, N. Alternatively, R may conveniently be selected from the group consisting of aromatic or aliphatic groups, linear, cyclic (mono- or poly-cyclic), branched, optionally substituted and/or fluorinated, optionally comprising heteroatoms, in particular O, S, N.

In formula $R(X)_n$ n is an integer equal to at least 2. Typically, n is an integer ≤10, more preferably n≤8, even more preferably n≤5. Values of n that have been generally found to be advantageous are 2, 3, and 4.

Each X, equal or different from each other, is a functional group selected from the group consisting of —$NH_2$, —$NHR_a$, wherein $R_a$ is selected from $C_1$-$C_{20}$ alkyl, —Si$(R_b)_3$, and $R_b$ is a $C_1$-$C_5$ alkyl, —OH, —$SO_2W$ (W=OH, F, Cl, Br, I). Preferably X is selected from the group consisting of —$NH_2$, —$NHR_a$, —$SO_3H$ (that is —$SO_2W$, W=OH).

An advantageous class of cross-linking agents (XL) is represented by aliphatic polyamines having two or more functional groups selected from primary amino groups, secondary amino groups and mixtures thereof, preferably primary amino groups.

Suitable aliphatic polyamines include but are not limited to: 1,2-diaminoethane; 1,3-diaminopropane; 1,4-diaminobutane; 1,5-diaminopentane; 1,6-diaminohexane; bis(2-aminoethyl)amine; tris(2-aminoethyl)amine; tetraethylene pentamine; N-(3-aminopropyl)butane-1,4-diamine; bis(3-aminopropyl)diamine; N,N'-bis(2-aminoethyl)ethane-1,2-diamine; and mixtures thereof.

Other suitable polyamines include alicyclic diamines such as 1,4-bis(2-aminoethyl)cyclohexane and piperazine.

Among aromatic amines mention may be made of carbocyclic and heterocyclic amines such as: 1,3-diaminobenzene; 1,4-diaminobenzene; 4-aminobenzenesulphonic acid; 2,4-diaminobenzenesulphonic acid; 2,5-diaminobenzenesulphonic acid; melamine.

Suitable polyol compounds which can be used as cross-linking agent (XL) include aliphatic polyhydric alcohols containing up to 100 carbon atoms and from 2 to 10 hydroxyl groups. Non-limiting examples include ethylene glycol, propylene glycol, trimethylene glycol, butylene glycol, and polyglycols such as diethylene glycol, tetraethylene glycol, dipropylene glycol, glycerol, pentaerythritol, dipentaerythritol, tripentaerythritol, 1,2-butanediol, 1,4-butanediol, 2,3-hexanediol, pinacol, tetrahydroxy pentane, erythritol, arabitol, sorbitol, mannitol.

Suitable polysulfonic acids include aliphatic compounds such as those derived from sulfonation of linear as well as cyclic polyols (i.e. carbohydrates, cellulose and its derivatives) and aromatic derivatives such as those derived from extensive sulfonation of carbo- and hetero-cyclic or polycyclic rings.

Preferably, cross-linking agent (XL) is selected from the group of aliphatic polyamines and aromatic amines. More preferably, cross-linking agent (XL) is selected from the group consisting of melamine, 1,3-diaminobenzene; 1,4-diaminobenzene; 4-aminobenzenesulphonic acid; bis(2-aminoethyl)amine; and tris(2-aminoethyl)amine.

When the cross-linked fluorinated polymer prepared with the inventive process is used in an ion conducting membrane preference is generally given to the group of aromatic amines for the increased stability towards radical degradation that may be provided by the aromatic rings in cross-linking agent (XL).

Step b) of the process is carried out under any condition suitable to form covalent bonds between at least one functional group X of cross-linking agent (XL) and the at least one —$SO_3M$ functional group in fluorinated polymer (P). Preferably, covalent bonds will be formed between the at least 2 functional groups (X) of cross-linking agent (XL) and the at least one functional group —$SO_3M$ in at least two distinct fluorinated polymer chains.

Depending on the nature of the functional groups in the cross-linking agent the person skilled in the art will be able to determine the best conditions to promote the reaction.

In an embodiment of the process said reaction is promoted by heating.

In an alternative embodiment said reaction may be promoted by the addition of suitable catalysts, e.g. dehydrating agents.

At the end of step b) cross-links will exist bridging distinct fluorinated polymer chains. The cross-links will comprise moiety R deriving from cross-linking agent (XL) as well as moiety(ies) deriving from the reaction between functional group —$SO_3M$ and functional group X.

For instance, when cross-linking agent (XL) comprises primary amino groups —$NH_2$ the moiety that forms by reaction with a functional group —$SO_3H$ is —$SO_2$—NH—. This reaction only involves the formation of water as a by-product.

In general it has been observed that when the cross-linking agent comprises functional groups selected from primary and/or secondary amino groups or sulfonic acid groups the reaction can be successfully promoted by heating at a temperature of at least 150° C., preferably of at least 170° C., more preferably of at least 180° C., even more preferably of at least 200° C. Typically the temperature does not exceed 350° C.; preferably it does not exceed 300° C.

The cross-linking agent (XL) is typically added to fluorinated polymer (P) in an amount lower than the stoichiometric amount needed to quantitatively react with the —$SO_3M$ functional groups in fluorinated polymer (P). In general, the amount of the cross-linking agent (XL) is such that the total number of functional groups X is at least 0.1% of the total number of the —$SO_3M$ functional groups in fluorinated polymer (P). Preferably, the total number of functional groups X is at least 0.5% of the total number of the —$SO_3M$ functional groups in fluorinated polymer (P). More preferably the total number of functional groups X is at least 1% of the total number of the —$SO_3M$ functional groups in fluorinated polymer (P).

In general, the amount of the cross-linking agent is such that the total number of functional groups X is less than 20% of the total number of the —$SO_3M$ functional groups in fluorinated polymer (P), preferably, less than 15% of the total number of the —$SO_3M$ functional groups in fluorinated polymer (P). More preferably the total number of functional groups X is less than 10% of the total number of the —$SO_3M$ functional groups in fluorinated polymer (P). A higher amount of the cross-linking agent would still provide improved mechanical properties to the article comprising the cross-linked fluorinated polymer.

When the article comprising the cross-linked fluorinated polymer is an ion conducting membrane for electrolytic applications an amount of cross-linking agent (XL) such that the total number of functional groups X is from 0.5 to 15%, even from 1 to 10%, of the total number of the —$SO_3M$ functional groups in fluorinated polymer (P) has been found to provide a particularly advantageous compromise between improved physical resistance and ion conductivity of the membrane.

Cross-linking agent (XL) is preferably liquid or a solid soluble in water or in polar organic solvents, such as alcohols, like propyl alcohols, ketones, like acetone, methylethylketone, esters, like methylacetate, dimethylcarbonate, diethylcarbonate, ethylacetate, nitriles, like acetonitrile, sulphoxides, like dimethylsulfoxide, amides, like N,N-dimethylformamide, N,N-dimethylacetamide, pyrrolidones, like N-methylpyrrolidone, N-ethylpyrrolidone.

Typically, cross-linking agent (XL) is provided in liquid form, either pure or in solution in a suitable solvent, and contacted with fluorinated polymer (P) which, as discussed above, may be provided either in solid form or under the form of a liquid composition. Preferably, fluorinated polymer (P) is provided in the form of a liquid composition.

Additional steps may optionally be present in the process of the invention.

In a first embodiment the process comprises the steps of:
a) providing a fluorinated polymer (P);
c) preparing a liquid composition comprising the fluorinated polymer (P) and at least one cross-linking agent (XL) of formula $R(X)_n$;
b) reacting said fluorinated polymer (P) with at least one cross-linking agent (XL) under conditions that promote the formation of covalent bonds between the at least one functional group —$SO_3M$ of fluorinated polymer (P) and at least one functional group X in cross-linking agent (XL).

Preferably, said first embodiment comprises the steps of:
a) providing a fluorinated polymer (P);
c) preparing a liquid composition comprising the fluorinated polymer (P) and at least one cross-linking agent (XL);
d) applying the liquid composition obtained in step c) onto a substrate; and
b) reacting said fluorinated polymer (P) with at least one cross-linking agent (XL) under conditions that promote the formation of covalent bonds between the at least one functional group —SO$_3$M of fluorinated polymer (P) and at least one functional group X in cross-linking agent (XL).

In step c) the liquid composition may advantageously be prepared by adding cross-linking agent (XL) to a liquid composition of fluorinated polymer (P) previously obtained as described above. Suitable solvents are water and polar organic solvents as detailed above, as well as mixtures thereof. The cross-linking agent may be added to the liquid composition of the fluorinated polymer (P) pure or after having been previously dissolved in a suitable solvent, such as those described above.

Thus, a further object of the invention is a liquid composition comprising: a liquid medium, a fluorinated polymer (P) dispersed or dissolved in said liquid medium, and a cross-linking agent (XL). Typically the liquid medium is water or a mixture of water and alcohol.

The liquid composition comprising fluorinated polymer (P) and cross-linking agent (XL) may optionally comprise additional ingredients. Mention can be made of non-ionic surfactants like TRITON® surfactant, TERGITOL® surfactant; as well as thermoplastic fluorinated polymers, typically having film-forming properties. Among thermoplastic fluorinated polymers which can be used in combination with the fluorinated ion conducting polymer (P) in the liquid composition, mention can be made of PFA, ETFE, PCTFE, PDVF, ECTFE, and the like.

In step d) of the process the liquid composition comprising fluorinated polymer (P) and cross-linking agent (XL) is applied onto a substrate.

Any conventional method known in the art, such as impregnation, casting, coating, e.g. roller coating, gravure coating, reverse roll coating, dip coating, spray coating and the like may be used to carry out step d).

The liquid composition may be cast over an inert, non porous, support in a film-forming layer which, after the reaction with the cross-linking agent and usually a drying step, is removed from the support providing an article, typically in the form of a film, consisting of the cross-linked fluorinated polymer. Common supports are for instance a plate, a belt or a fabric, made of glass, metal or polymeric material from which the film of the cross-linked polymer may be removed.

Alternatively, the process may be used for the preparation of composite articles, that is articles comprising a support, preferably a porous support, in addition to the cross-linked fluorinated polymer. Notable examples of composite articles are for instance composite membranes, fabrics, fibres. Composite membranes can be used both as ion conducting membranes in electrolytic cells or as membranes for filtration or ultrafiltration applications. The term "membrane" is used herein in its usual meaning to indicate a discrete, generally thin, interface that moderates the permeation of chemical species in contact with it.

Said composite articles may be prepared by casting or coating the liquid composition over a suitable porous support. Alternatively they may be prepared with the liquid composition with an impregnation process.

Such an impregnation process comprises the step of impregnating a porous support with the liquid composition comprising fluorinated polymer (P) and cross-linking agent (XL).

The choice of the porous support is not particularly limited. Porous supports which are generally inert at the conditions of use of the composite article will generally be preferred.

Among porous inert materials suitable for the preparation of the composite article mention can be made of fabrics, fibers, inorganic materials, woven or non-woven polyolefin membranes, and fluorinated polymer porous supports.

When the article is an ion conducting or filtration membrane, porous supports of fluorinated polymers are generally preferred because of their high chemical inertia. Biaxially expanded PTFE porous supports (otherwise known as ePTFE membranes) are among preferred supports. These supports are notably commercially available under trade names GORE-TEX®, TETRATEX®.

Impregnation can be carried out by immersion of the porous support into an impregnation vessel comprising the liquid composition or it can be performed by applying suitable amounts of the same by well-known coating techniques such as casting, coating, spraying, brushing and the like, either simultaneously on each side of the porous support or in subsequent coating steps. It is nevertheless generally understood that impregnation by immersion in a vessel comprising the liquid composition is the technique having provided best results.

The embodiment of the process comprising steps a), c) optionally d) and b) also typically comprises at least one drying step and/or at least one annealing step.

The drying step is typically intended to remove excess liquid medium from the film of fluorinated polymer (P). This step is generally carried out at a temperature of from 20 to 100° C., preferably from 25 to 90° C., more preferably from 30 to 80° C.

The annealing step, typically conceived for consolidating the film of fluorinated polymer (P), is generally carried out at a temperature of at least 150° C., preferably of at least 170° C., more preferably of at least 180° C., and even more preferably of at least 200° C. Maximum temperature is not particularly limited, provided that the porous support and the fluorinated polymer (P) remain stable under these conditions. Generally the annealing step is carried out at a temperature not exceeding 300° C., preferably not exceeding 270° C., more preferably not exceeding 250° C.

Step b) of the process, i.e. reacting fluorinated polymer (P) with cross-linking agent (XL) may conveniently be carried out at the same time as the annealing step. Preferably, step b) corresponds to the annealing step.

In a second embodiment the process comprises the steps of:
a) providing a fluorinated polymer (P);
c') preparing a film comprising fluorinated polymer (P); and
b) reacting said fluorinated polymer (P) with at least one cross-linking agent (XL) under conditions that promote the formation of covalent bonds between the at least one functional group —SO$_3$M of fluorinated polymer (P) and at least one functional group X in cross-linking agent (XL).

Preferably, said process comprises the steps of:
a) providing a fluorinated polymer (P);
c') preparing a film comprising the fluorinated polymer (P);
d') contacting said film with a liquid composition comprising at least one cross-linking agent (XL); and
b) reacting said fluorinated polymer (P) with the at least one cross-linking agent (XL) under conditions that promote the formation of covalent bonds between the at least one functional group —SO$_3$M of fluorinated polymer (P) and at least one functional group X in cross-linking agent (XL).

The film of fluorinated polymer (P) may be prepared using any conventional technique. Said film may be prepared for instance from a liquid dispersion of the fluorinated polymer (P) using a casting or coating process, as described above. Alternatively, said film may be prepared by extrusion as known in the art, followed by hydrolysis.

The film is then contacted with a liquid composition comprising the cross-linking agent (XL). Said liquid composition may consist of cross-linking agent (XL), when the cross-linking agent is liquid, or alternatively it may comprise cross-linking agent (XL) and a suitable solvent as described above. Typically, the film is immersed in the liquid composition comprising the cross-linking agent for a length of time to allow uniform diffusion of the cross-linking agent through the fluorinated polymer film. Typical immersion times may range from 10 to 100 minutes, depending on the thickness of the film.

In general the film is removed from the liquid composition comprising the cross-linking agent before being subjected to the conditions which promote the reaction between functional groups X in cross-linking agent (XL) and functional groups —$SO_3M$ in fluorinated polymer (P). Said reaction may be promoted by heating the film of fluorinated polymer (P) imbibed with cross-linking agent (XL).

Regardless of the preparation process, the article comprising the cross-linked fluorinated polymer (XLP) can be submitted to additional steps, including for instance, an acid treatment step, rinsing steps for removal of organic pollutants, and the like.

The article comprising the cross-linked fluorinated polymer (XLP) obtained from the process of the invention is a further object of the invention.

Thus, the invention is also directed to an article comprising a cross-linked fluorinated polymer (XLP), said polymer comprising covalent cross-links comprising moiety —R— as well as moiety(ies) deriving from the reaction between functional group —$SO_3M$ and functional group X.

The article may be a film consisting of the cross-linked polymer (XLP). Alternatively, the article may be a fabric or a fibre to which the cross-linked polymer (XLP) provides hydrophilic properties. Preferably the article is an ion conducting membrane or a filtration membrane. More preferably the article is an ion conducting membrane.

In a preferred embodiment, the membrane comprises:
a porous support (as above detailed); and,
a cross-linked fluorinated polymer (XLP) as above defined impregnated on the support.

The ion conducting membranes of the invention, in particular composite membranes, are useful as proton exchange membranes in fuel cell applications. The Applicant has found that said ion conducting membranes are provided with a higher stability under the conditions of use of the fuel cell with respect to membranes obtained using non cross-linked fluorinated polymer (P).

The definitions and preferences defined previously within the context of the inventive process with respect to fluorinated polymer (P) and cross-linking agent (XL), apply to the first and second embodiment of the process, to the dispersion suitable to carry out the process according to its first embodiment, as well as to the articles comprising the cross-linked polymer (XLP).

The invention will be now described in more detail with reference to the following examples, whose purpose is merely illustrative and not intended to limit the scope of the invention.

Should the disclosure of any patents, patent applications, and publications which are incorporated herein by reference conflict with the description of the present application to the extent that it may render a term unclear, the present description shall take precedence.

EXAMPLES

Example 1

Preparation of a Liquid Composition Comprising Fluorinated Polymer (P1)

In a 22 l autoclave the following reagents were charged:
11.5 l of demineralised water;
980 g of the monomer with formula: $CF_2$=CF—O—$CF_2CF_2$—$SO_2F$
3100 g of a 5% weight solution of $CF_2ClO(CF_2CF(CF_3)O)_n(CF_2O)_mCF_2$ COOK in water (average molecular weight=521, ratio n/m=10).

The autoclave, stirred at 470 rpm, was heated at 60° C. A water based solution with 6 g/l of potassium persulfate was added in a quantity of 150 ml. The pressure was maintained at a value of 12 bar (abs) by feeding TFE.

After adding 1200 g of TFE in the reactor, 220 g of the monomer $CF_2$=CF—O—$CF_2CF_2$—$SO_2F$ were added every 200 g of TFE fed to the autoclave.

The reaction was stopped after 280 min by stopping the stirring, cooling the autoclave and reducing the internal pressure by venting the TFE; a total of 4000 g of TFE were fed.

The latex was then coagulated by freezing and thawing and the recovered polymer was washed with water and dried at 150° C. for 24 hours. The polymer was then treated as follows:

Contact for 8 hours at 80° C. with fluorine gas in a metallic vessel, than purged several hours with nitrogen Immersion in a KOH solution (10% by weight) at 80° C. for 8 hours to convert the —$SO_2F$ functional groups into —$SO_3K$ functional groups, followed by washing in demineralised water at room temperature;

Immersion in a $HNO_3$ solution (20% by weight) at room temperature for 2 hours, followed by washing in demineralised water at room temperature.

The resulting fluorinated polymer in —$SO_3H$ form was then dried in a vacuum oven at 80° C. The equivalent weight of the polymer (EW) was determined (by IR analysis on the precursor polymer) to be 790 g/eq.

The residual amount of —$SO_2F$ functional groups in the fluorinated polymer in —$SO_3H$ form was assessed by means of FTIR (Fourier Transformate InfraRed) spectroscopy, by the disappearance of the band at 1470 $cm^{-1}$, corresponding to vibrational stretching of the O=S=O group, and the appearance of the band at 1050-1060 $cm^{-1}$, characteristic of the —$SO_3H$ moiety. Disappearance of the —$SO_2F$ band at 1470 $cm^{-1}$ corresponds to an amount of —$SO_2F$ groups of less than $10^{-5}$ mmol —$SO_2F$/Kg polymer (the detection limit of the FTIR method).

Thus, based on the equivalent weight of the polymer (790 g polymer/equivalent of —$SO_3H$) the residual amount of —$SO_2F$ groups in fluorinated polymer (P1) was calculated to be less than 7.9 $10^{-9}$ mol —$SO_2$ F/equivalent of —$SO_3H$, that is 7.9 $10^{-7}$% with respect to the total number of —$SO_2F$ and —$SO_3H$ functional groups in fluorinated polymer (P1).

A liquid composition comprising the fluorinated polymer thus obtained and water was prepared following the procedure described in U.S. Pat. No. 4,433,082 (DU PONT) 21 Feb. 1984 using an autoclave model LIMBO 350 (Buchi Glas Uster) at 250° C. The liquid composition contained 20% by weight fluorinated polymer.

Examples 2-5

Preparation of Liquid Compositions Comprising Fluorinated Polymer (P) and Cross-Linking Agents A to D To the liquid composition of Example 1 cross-linking agents were added as detailed below. Each liquid composition contained an amount of cross-linking agent corresponding to 4 mol % of the —$SO_3H$ groups present in the fluorinated polymer (P1), said amount being calculated considering that all the functional groups in the cross-linking agent react with the —$SO_3$ H groups of the fluorinated polymer. The following cross-linking agents were used:

Example 2: tris(2-aminoethyl)amine [cross-linking agent A];
Example 3: 1,4-diaminobenzene [cross-linking agent B];
Example 4: 4-aminobenzenesulfonic acid [cross-linking agent C];
Example 5: melamine [cross-linking agent D].

Example 6

Preparation of Membranes From the Liquid Compositions of Examples 1 to 5

The liquid compositions of Examples 1 to 5 were diluted with a 1:1 mixture by volume of n-propyl and iso-propyl alcohol to obtain a polymer concentration of 10% by weight.

Foamed PTFE supports (TETRATEX® #3101), having an average pore diameter of 0.2 μm (specified from the manufacturer) and a thickness of 35 μm, mounted on a PTFE circular frame having an internal diameter of 100 mm, were immersed in each liquid composition and then dried in oven at a temperature of 65° C. for 60 minutes and then at 90° C. for additional 60 minutes. This step was repeated twice in order to have complete impregnation of the support.

The five impregnated supports were transparent and colourless indicating full occlusion of the pores of the support.

The impregnated supports were then treated in oven at 230° C. for 30 minutes to promote the reaction of the functional groups on cross-linking agents A to D with the —$SO_3H$ functional groups in the fluorinated polymer (P1).

The formation of stable cross-links between the —$SO_3H$ functional groups in the fluorinated polymer (P1) and cross-linking agent A was confirmed by the appearance in the IR spectrum of the cross-linked polymer of signals at 2900-3000 $cm^{-1}$ assigned to the stretching of C—H bonds (not present in polymer P1).

The thickness of the five resulting membranes (referred to as M1 to M5) was in the range of from 25 and 30 μm.

Example 7

Fuel Cell Characterization of Membranes M1 to M5 Prepared in Example 6

Membranes M1 to M5 were assembled in a single cell (Fuel Cell Technology®) with an active area of 25 $cm^2$ and tested on an Arbin® 50 W test stand. The membranes were assembled with E-TEK® LT250EW gas diffusion electrodes (0.5 mg/$cm^2$ Pt).

The test operating conditions were fixed as follow:
Reactants stoichiometry: 2.8 air-3.4 $H_2$ (pure $H_2$ 5.5 grade)
Reactant humidity level: 100%
Cell temperature: 75° C.
Operating pressure: 2.5 bar (abs)

After 24 hours conditioning at a fixed voltage of 0.6 V a polarization curve was measured to verify the membrane performance. The conductivity of membranes M2 to M5 was found not to differ from the conductivity of reference membrane M1.

Then the membranes were tested at the following operating conditions:
Anode side flow: 500 sccm pure $H_2$, 64° C. dew point, 1 bar (abs)
Cathode side flow: 500 sccm pure $O_2$, 64° C. dew point, 1 bar (abs)
Cell temperature: 90° C.
Open circuit voltage condition (=current zero ampere).

The voltage was monitored during the test. The end of test was determined to be a voltage below 0.7 V, which is typically assumed to indicate the formation of pinholes in the membrane. The results are reported in Table 1.

TABLE 1

| Membrane | Time to reach voltage <0.7 V (hours) |
|---|---|
| M1 (reference) | 220 |
| M2 | 400 |
| M3 | 510 |
| M4 | 640 |
| M5 | 1005 |

With respect to a membrane comprising a fluorinated polymer (P) free of cross-links (M1) the cross-linked membranes of the invention show a significant increase in stability under fuel cell operating conditions.

The tensile properties of the cross-linked membrane M2 were also improved with respect to the cross-link free membrane M1 as shown by the data in Table 2 (obtained according to ASTM D638 type V at a speed of 50 mm/min, measured at 23° C. and 50% relative humidity).

TABLE 2

| Membrane | Modulus (MPa) | Yield Stress (MPa) | Stress at break (MPa) | Strain at break (%) |
|---|---|---|---|---|
| M1 (reference) | 264 | 12 | 27.9 | 213 |
| M2 | 318 | 14 | 27.7 | 175 |

The invention claimed is:
1. A process for the preparation of a cross-linked fluorinated polymer (XLP) comprising sulfonic acid functional groups, the process comprising the steps of:
   a) providing a liquid composition comprising at least one fluorinated polymer (P) in a liquid medium comprising water, wherein fluorinated polymer (P) comprises at least one —$SO_3M$ functional group, wherein each M is selected from the group consisting of H and alkaline metals, said fluorinated polymer (P) containing less than 2% of —$SO_2F$ functional groups with respect to the total number of —$SO_3M$ and —$SO_2F$ functional groups; and b) reacting said fluorinated polymer (P) with at least one cross-linking agent (XL) of formula $R(X)_n$ wherein:

R is selected from a bond, O, S, N, an aromatic group and an aliphatic group, wherein the aliphatic group may be linear, cyclic, or branched, wherein one or more carbons on the aromatic group or the aliphatic group may be further substituted and/or fluorinated, and wherein carbons in the aromatic group or the aliphatic group may be interrupted by one or more heteroatoms;

n is an integer ≥2; and

X is a functional group selected from the group consisting of $—NH_2$, $—NHR_a$, $—Si(R_b)_3$, —OH, and $—SO_2W$, wherein $R_a$ is a $C_1$-$C_{20}$ alkyl, $R_b$ is a $C_1$-$C_5$ alkyl, and W is selected from OH, F, Cl, Br, and I;

said reaction being carried out under conditions that promote the formation of covalent bonds between the at least one functional group $—SO_3M$ of the fluorinated polymer (P) and at least one functional group X in the cross-linking agent (XL).

2. The process according to claim 1, wherein the fluorinated polymer (P) contains less than 0.1% of $—SO_2F$ functional groups with respect to the total number of $—SO_3M$ and $—SO_2F$ functional groups.

3. The process according to claim 1, further comprising the steps of: c) adding the cross-linking agent (XL) to the liquid composition; and d) applying the liquid composition prepared in step c) onto a substrate; said steps c) and d) being carried out before step b).

4. The process according to claim wherein said liquid composition is applied onto an inert, non porous, support in a film-forming layer which, after step b), is removed from the support providing an article consisting of the cross-linked fluorinated polymer (XLP).

5. The process according to claim wherein said liquid composition is applied onto a porous support.

6. The process according to claim wherein the formation of covalent bonds between at least one functional group X of the cross-linking agent (XL) and the at least one $—SO_3M$ functional group in the fluorinated polymer (P) is promoted by heating.

7. The process according to claim wherein said formation of covalent bonds is promoted by heating at a temperature of at least 150° C.

8. The process according to claim 1, wherein the amount of cross-linking agent (XL) is such that the total number of functional groups X is at least 0.1% and less than 20% of the total number of the $—SO_3M$ functional groups in fluorinated polymer (P).

9. The process according to claim 1, wherein the functional group X is selected from $—NH_2$, $—NHR_a$ and $—SO_2W$.

10. The process according to claim wherein the cross-linking agent (XL) is selected from the group consisting of melamine, 1,3-diaminobenzene; 1,4-diaminobenzene; 4-aminobenzenesulphonic acid; bis(2-aminoethyl)amine; tris(2-aminoethyl)amine.

* * * * *